US012641688B2

(12) United States Patent
Heo et al.

(10) Patent No.: US 12,641,688 B2
(45) Date of Patent: May 26, 2026

(54) INDUCTION HEATING DEVICE

(71) Applicant: LG ELECTRONICS INC., Seoul (KR)

(72) Inventors: Jea Shik Heo, Seoul (KR); Ho Yong Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 910 days.

(21) Appl. No.: 17/797,005

(22) PCT Filed: Jun. 26, 2020

(86) PCT No.: PCT/KR2020/008309
§ 371 (c)(1),
(2) Date: Aug. 2, 2022

(87) PCT Pub. No.: WO2021/172667
PCT Pub. Date: Sep. 2, 2021

(65) Prior Publication Data
US 2023/0056952 A1 Feb. 23, 2023

(30) Foreign Application Priority Data
Feb. 27, 2020 (KR) ........................ 10-2020-0024188

(51) Int. Cl.
*H05B 6/12* (2006.01)
*H05B 6/06* (2006.01)
*H05B 6/44* (2006.01)

(52) U.S. Cl.
CPC ........... *H05B 6/1272* (2013.01); *H05B 6/065* (2013.01); *H05B 6/44* (2013.01); *H05B 2213/05* (2013.01)

(58) Field of Classification Search
CPC .... G02B 6/381; G02B 6/3814; G02B 6/4251; G02B 6/4268; H05B 2213/05;
(Continued)

(56) References Cited

U.S. PATENT DOCUMENTS 4,334,135 A 6/1982 Smith
10,932,329 B2 * 2/2021 Lee .................... G06F 3/04883
(Continued)

FOREIGN PATENT DOCUMENTS

EP 3582588 A1 12/2019
JP 2003-282232 A 10/2003
(Continued)

*Primary Examiner* — Quang T Van
(74) *Attorney, Agent, or Firm* — Bryan Cave Leighton Paisner LLP

(57) ABSTRACT

Disclosed is an induction heating device. The disclosed induction heating device senses whether a container placed on a heating coil is off-center, and if so, the direction in which the container is off-center, on the basis of a change in the resonance current of a plurality of sensing coils disposed along the circumferential direction above the heating coil. Each of the plurality of sensing coils includes a plurality of first layer sensing coils and a plurality of second layer sensing coils. Each of the plurality of first layer sensing coils is electrically connected to a corresponding second layer sensing coil among the plurality of second layer sensing coils. The first layer sensing coil and the second layer sensing coil that are connected to each other are vertically misaligned and have opposite winding directions.

15 Claims, 11 Drawing Sheets

(58) Field of Classification Search
CPC ...... H05B 6/062; H05B 6/065; H05B 6/1272; H05B 6/44; H05B 6/1263
USPC ....... 219/624, 620, 621, 622, 625, 626, 630, 219/635, 650, 672, 675
See application file for complete search history.

(56) References Cited

U.S. PATENT DOCUMENTS

| | | | | |
|---|---|---|---|---|
| 2018/0376543 | A1 | 12/2018 | Kang et al. | |
| 2022/0386423 | A1 * | 12/2022 | Jeong | H05B 6/062 |

FOREIGN PATENT DOCUMENTS

| | | | |
|---|---|---|---|
| JP | 2016-157590 | A | 9/2016 |
| KR | 10-1860490 | B1 | 5/2018 |
| KR | 10-2018-0129201 | A | 12/2018 |

* cited by examiner

[FIG. 1]
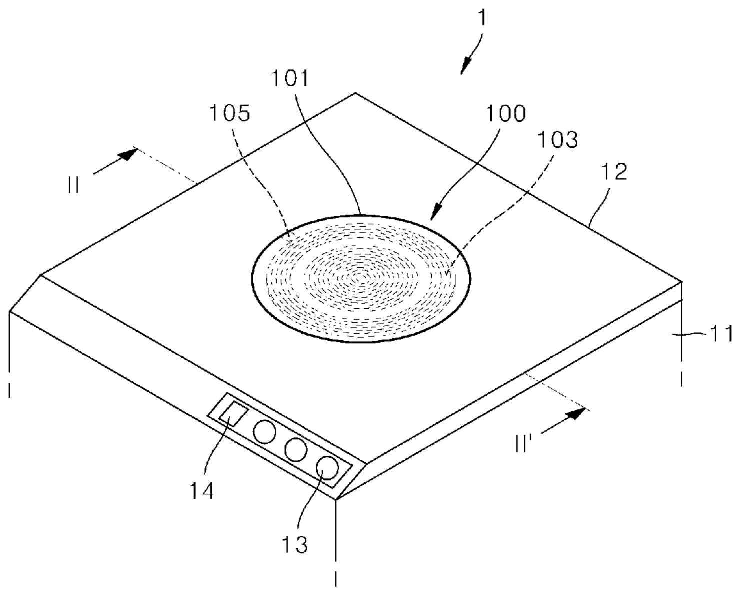
[FIG. 2]
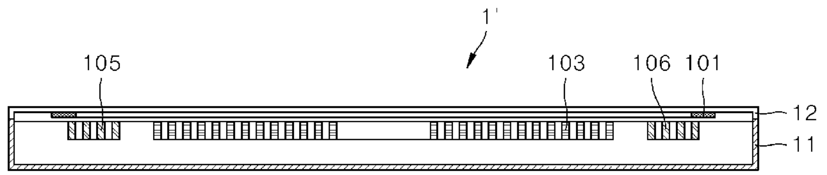
[FIG. 3]
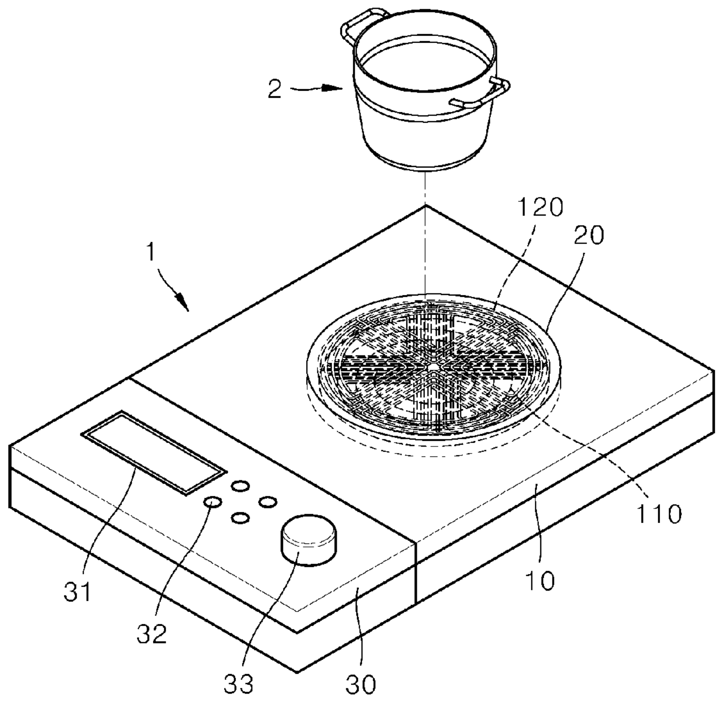

[FIG. 4]
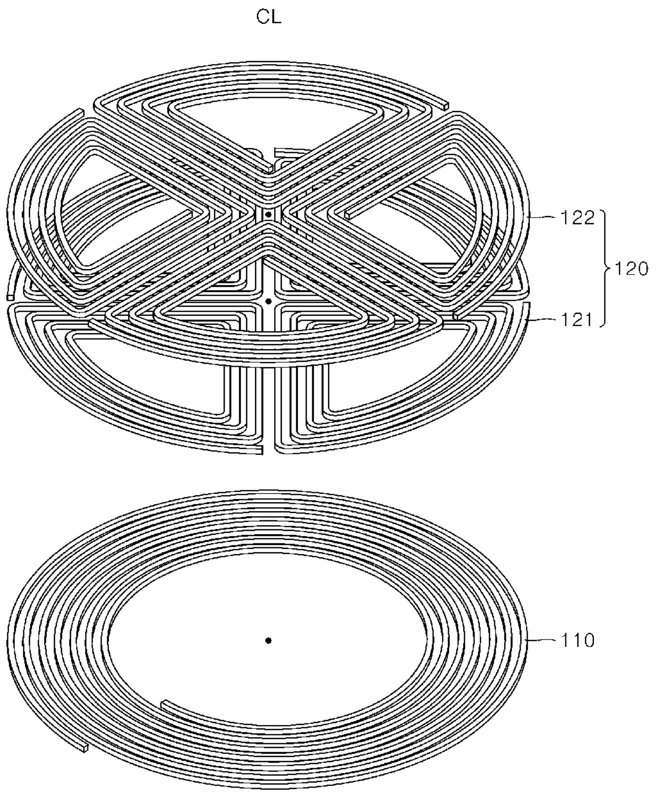

[FIG. 5]
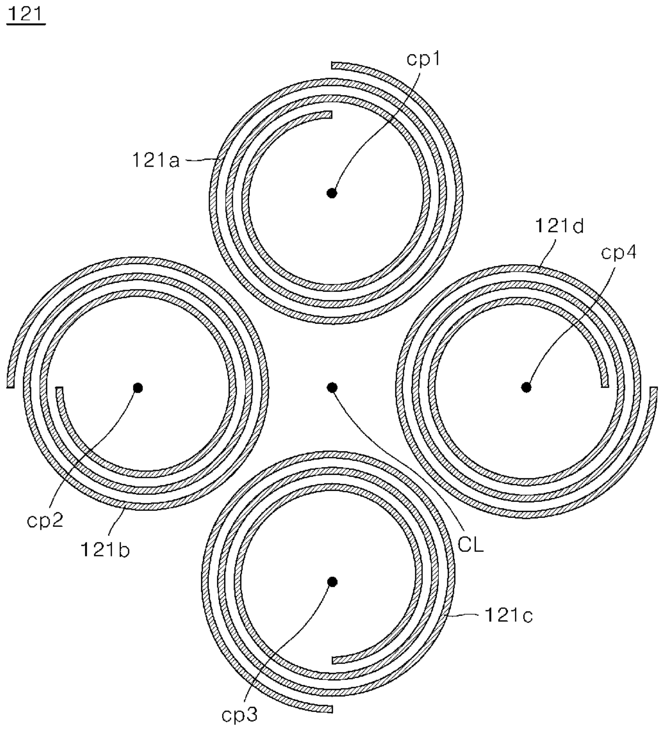

[FIG. 6]
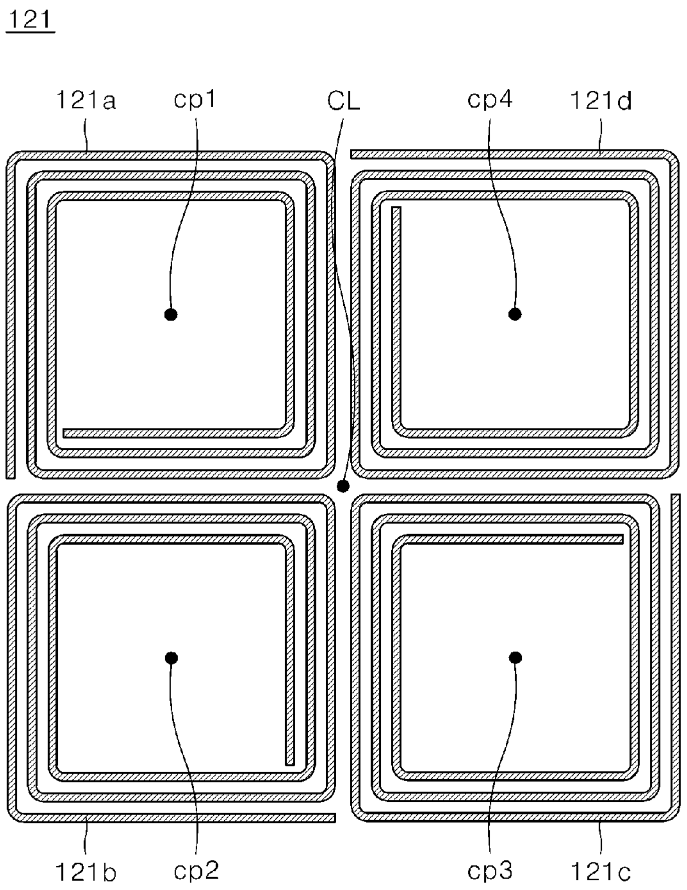

[FIG. 7]
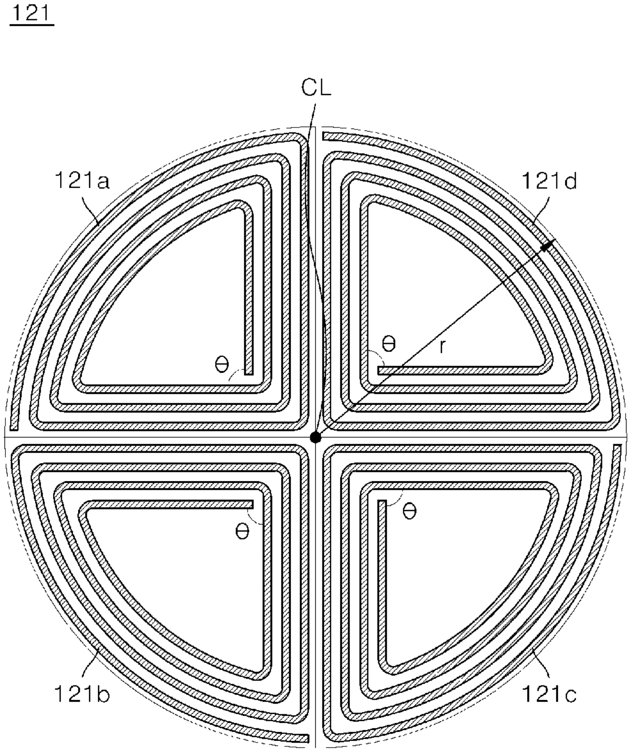

[FIG. 8]
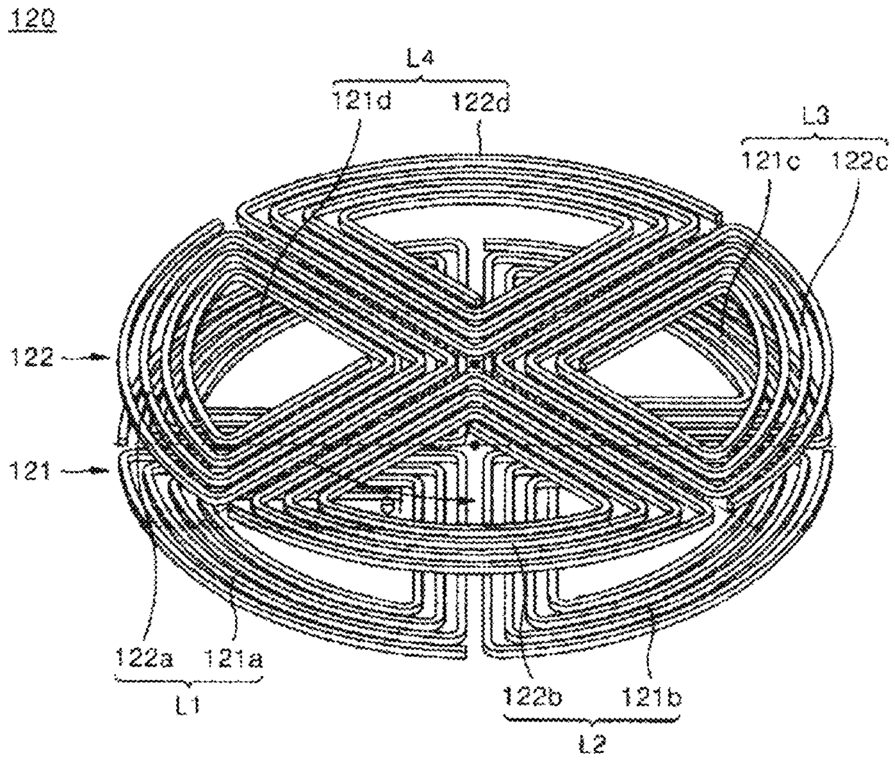

[FIG. 9]
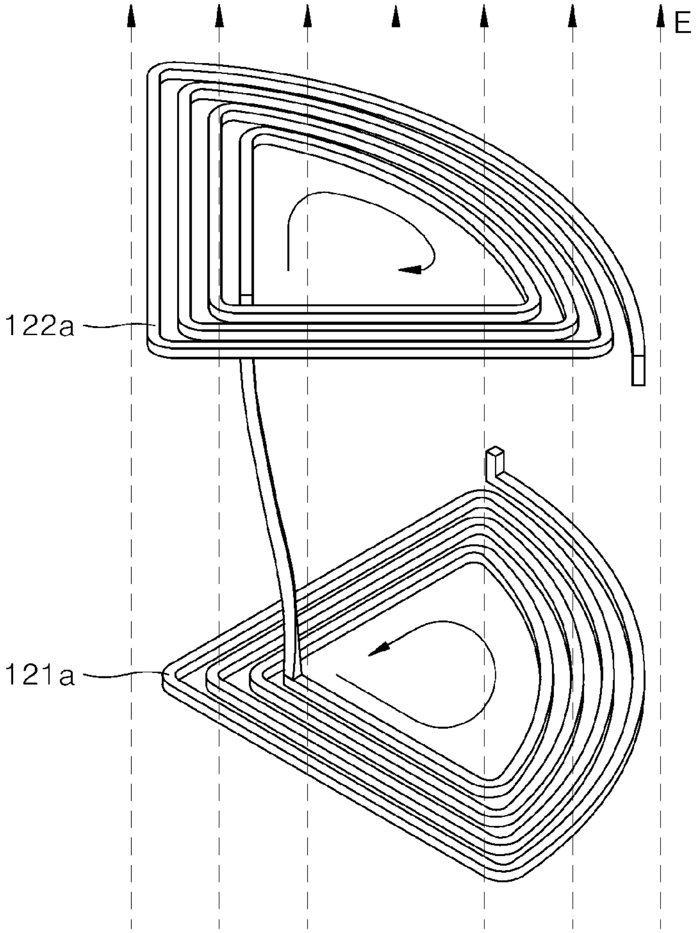
[FIG. 10]
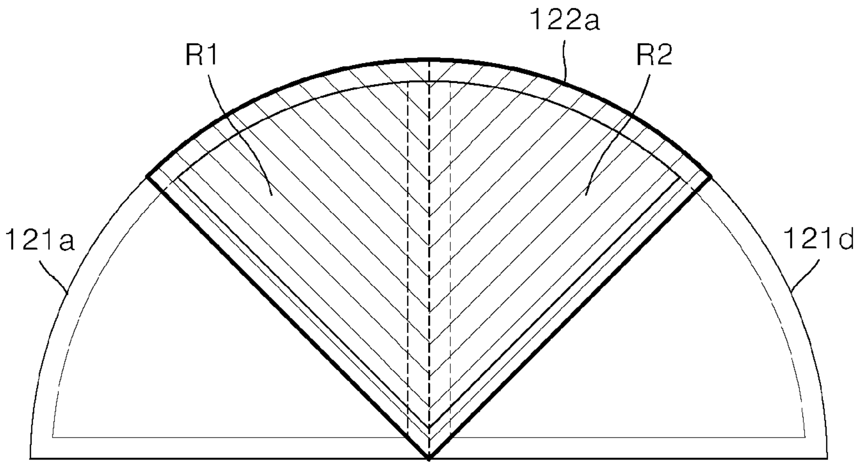

[FIG. 11]
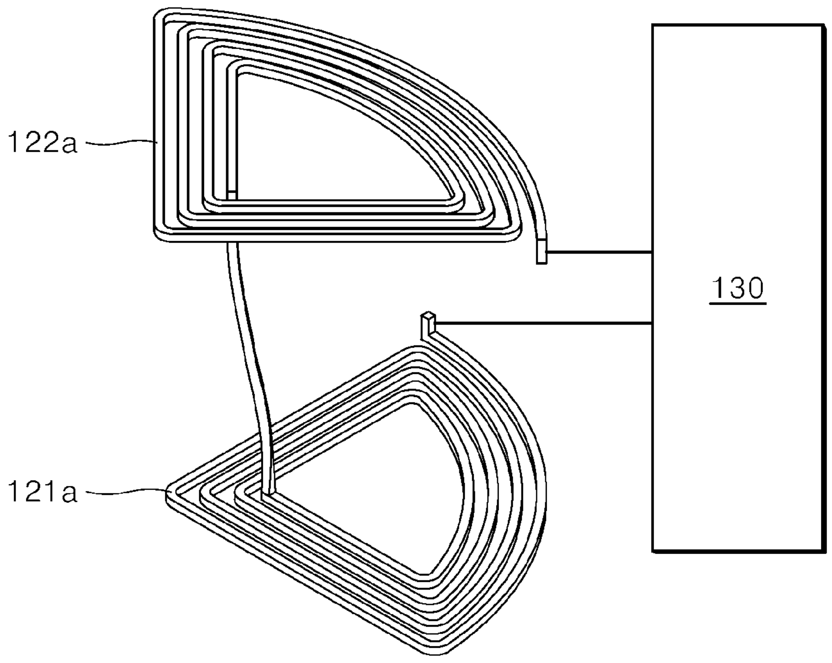
[FIG. 12]
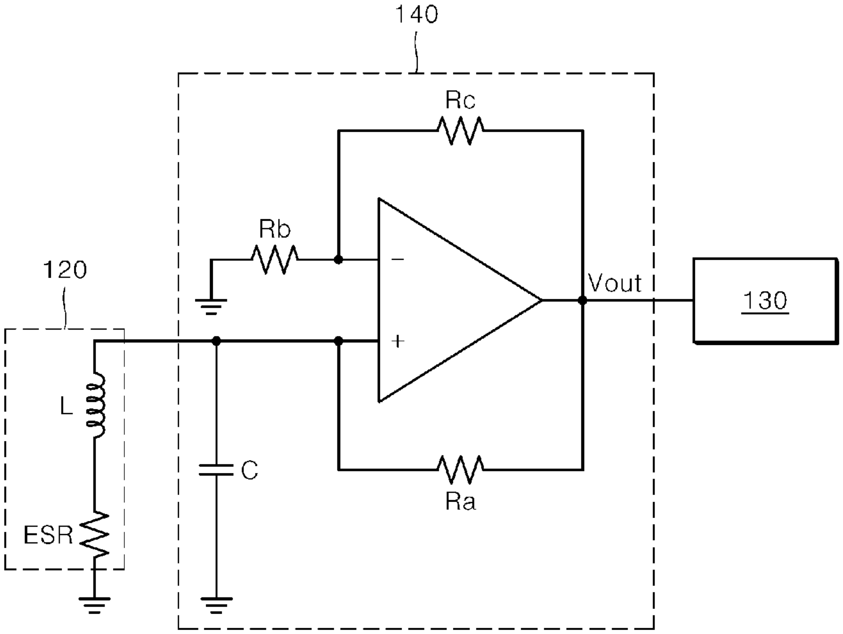

[FIG. 13]
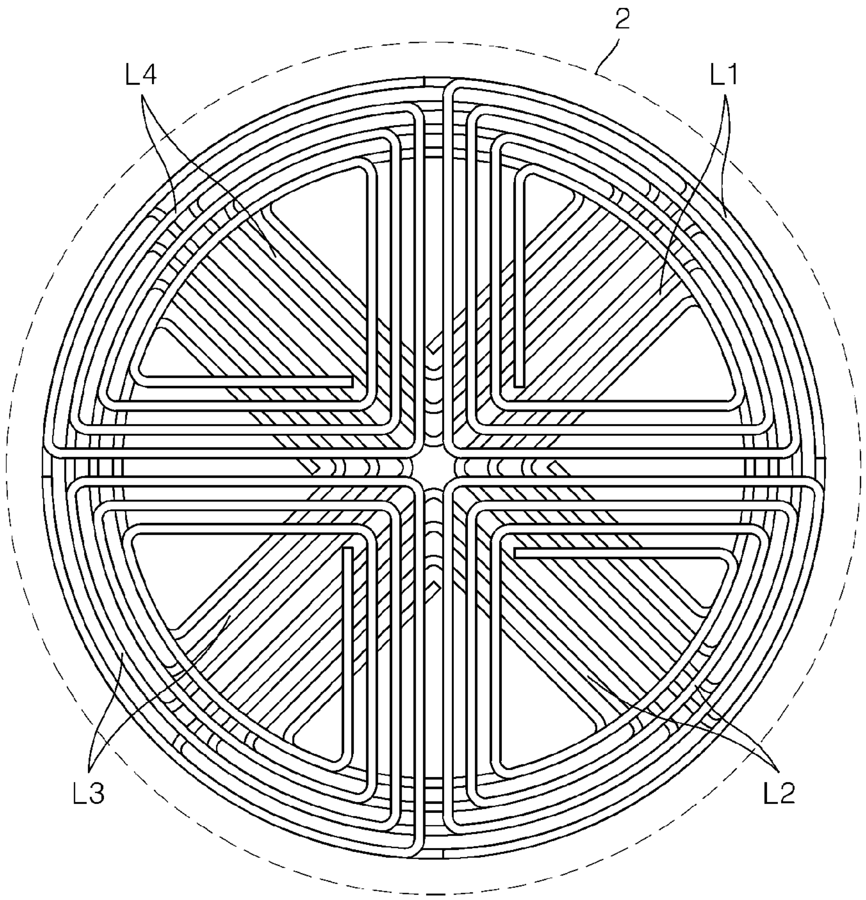
[FIG. 14]
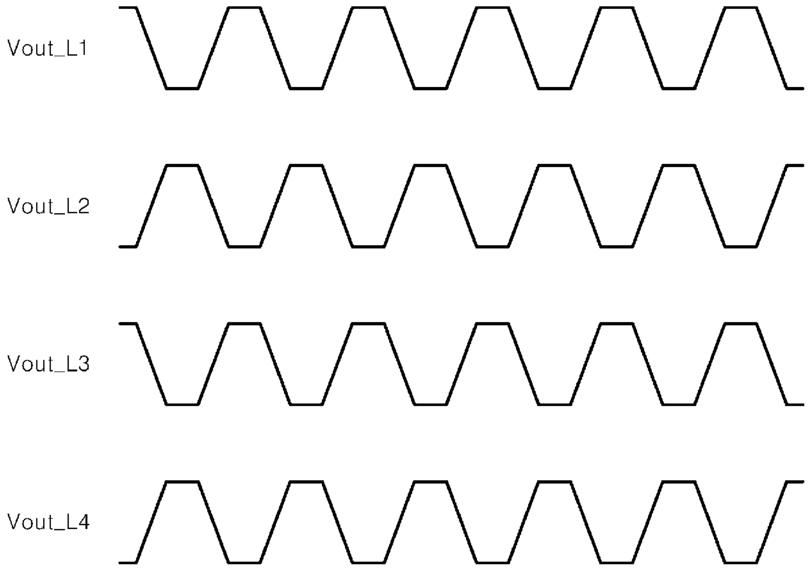

[FIG. 15]
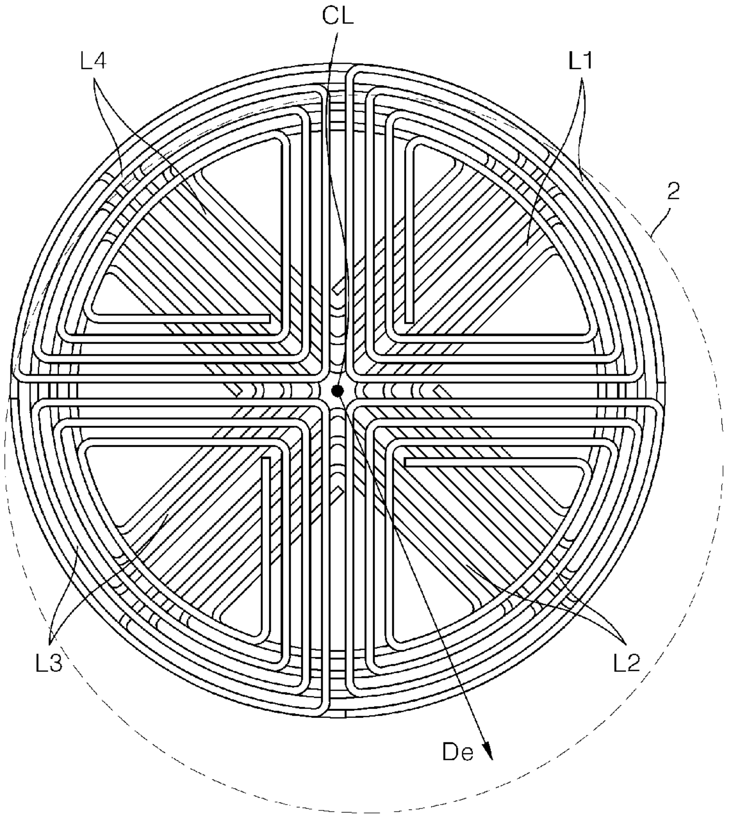
[FIG. 16]
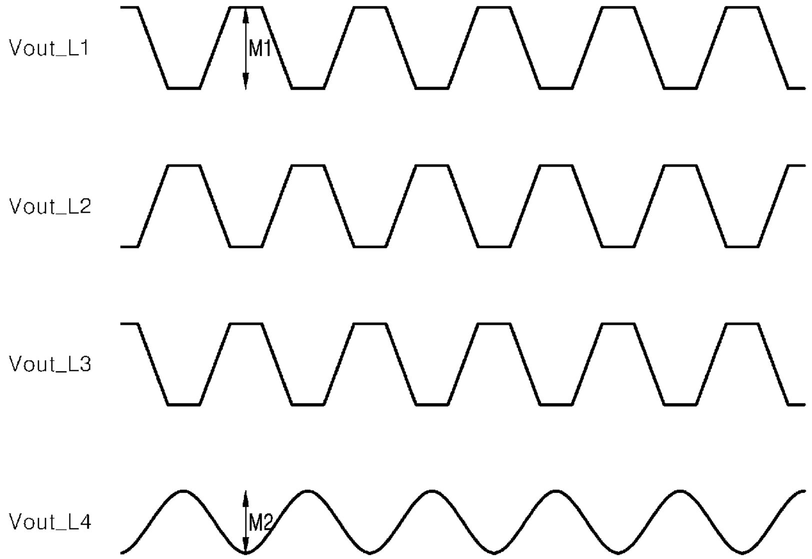

[FIG. 17]
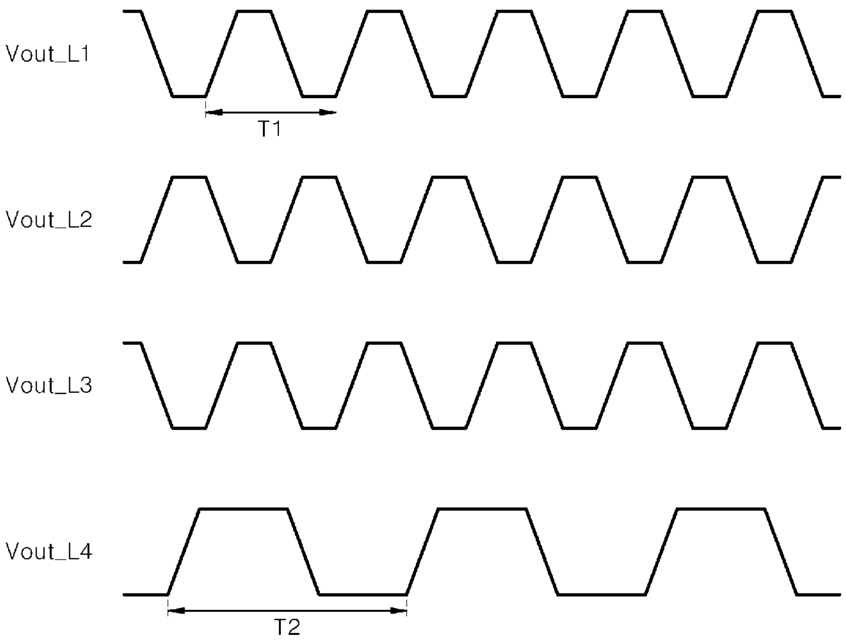

INDUCTION HEATING DEVICE

CROSS-REFERENCE TO RELATED APPLICATIONS

This application is the National Stage filing of International Application No. PCT/KR2020/008309, filed Jun. 26, 2020, which claims the benefit of earlier filing date and right of priority to Korean Application No. 10-2020-0024188, filed on Feb. 27, 2020, the contents of which are all hereby incorporated by reference herein in their entirety.

TECHNICAL FIELD

Disclosed herein is an induction heating device that can detect whether a container placed on a heating coil is eccentric and can sense a direction of eccentricity, by using a plurality of sensing coils having a sector shape and being arranged circumferentially on the heating coil.

Background Art

In recent years, various types of cooking appliances using a wireless induction heating method have been developed. Under the circumstances, research has been conducted into a device (hereafter, an induction heating device) that heats a food item to be cooked by using a magnetic field.

As a container is placed on the induction heating device and then the induction heating device supplies current to a heating coil therein, a magnetic field is generated in a direction of the container and induces eddy current to the container, to heat the container.

In the above-mentioned method, to maximize heating efficiency and evenly heat the container, the heating coil and the container need to be aligned perpendicularly. However, since ordinary users do not understand why a container is aligned with a heating coil technically, a container is usually placed approximately on the induction heating device.

Accordingly, the container is partially off-center (hereafter, being eccentric) on the heating coil of the induction heating device, and due to eccentricity, a food item to be cooked in the container is undercooked or overheated depending on a position of the food item, causing deterioration in cooking quality.

To solve the problem, a technology for detecting eccentricity of a container is suggested in KR Patent No. 10-1904642 (hereafter, a prior art document). Hereafter, a method of detecting eccentricity according to the prior art document is described with reference to FIGS. 1 and 2.

FIGS. 1 and 2 are excerpted from the drawings (FIGS. 1 and 2) of the prior art document, and are view for describing the method of the related art by which eccentricity of a container is sensed.

Referring to FIGS. 1 and 2, an induction heating device 1' according to the prior art document includes a heating coil 103, and a plurality of sensing coils 105, 106 being arranged around the heating coil 103 and sensing a load placed in a heating zone 102.

In the case, a current measuring part (not illustrated) measures current flowing in each of the sensing coils 105, 106 and compares the measurement with a reference value, to determine whether a load is mounted onto the heating zone 102.

However, according to the prior art document, the plurality of sensing coils 105, 106 are necessarily placed around the heating coil 103, to sense eccentricity. That is, according to the prior art document, a coil needs to be placed even in a zone where heating is not actually performed, causing inefficiency in the usability of space when it comes to design of the induction heating device 1'.

DESCRIPTION OF INVENTION

Technical Problems

One objective of the present disclosure is to provide an induction heating device that can detect whether a container is eccentric by using a sensing coil placed on a heating coil.

Another objective of the present disclosure is to provide an induction heating device that can sense a direction of eccentricity of a container, by using sensing coils arranged circumferentially side by side.

Yet another objective of the present disclosure is to provide an induction heating device that prevents a magnetic field output from a heating coil from being offset by a sensing coil placed on the heating coil.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

According to the present disclosure, an induction heating device may include a plurality of sensing coils being arranged circumferentially side by side on a heating coil, and based on a change in resonance current generated in each sensing coil, detect whether a container is eccentric.

According to the present disclosure, the induction heating device can identify at least one sensing coil where resonance current changes, among the plurality of sensing coils arranged circumferentially side by side, and based on a direction in which the identified sensing coil is arranged, sense a direction of eccentricity of a container.

According to the present disclosure, the plurality of sensing coils are disposed in two layers, and any one layer of sensing coils and the other layer of sensing coils are designed to be wound in opposite directions, to prevent a magnetic field output from the heating coil from being offset by the sensing coils placed on the heating coil.

Advantageous Effects

According to the present disclosure, an induction heating device may detect whether a container is eccentric, by using a sensing coil placed on a heating coil, thereby ensuring efficiency in usability of space when it comes to design of a device for sensing eccentricity.

The induction heating device may sense a direction of eccentricity of a container by using sensing coils arranged circumferentially side by side, thereby informing a user of a direction of movement of the container and effectively guiding the container to the correction position.

The induction heating device may prevent a magnetic field output from the heating coil from being offset by the sensing coil disposed on the heating coil, thereby preventing deterioration in heating efficiency, caused by the operation of sensing eccentricity.

Specific effects are described along with the above-described effects in the section of Detailed Description.

BRIEF DESCRIPTION OF DRAWINGS

FIGS. 1 and 2 are views for describing a method of sensing eccentricity of a container in the related art.

FIG. 3 is a view showing an induction heating device of one embodiment, and a container placed on the induction heating device.

FIG. 4 is a view showing that a heating coil separates from a sensing part including first and second layer sensing coils, in one embodiment.

FIGS. 5 to 7 are views showing disposition of sensing coils in each embodiment.

FIG. 8 is view showing that a first layer sensing coil and a second layer sensing coil are misaligned.

FIG. 9 is a view showing that a first layer sensing coil and a second layer sensing coil, wound in opposite directions, connect to each other.

FIG. 10 is a view showing that any one first layer sensing coil is disposed to overlap two adjacent second layer sensing coils.

FIG. 11 is a view showing that a controller allows resonance current to flow in a pair of a first layer sensing coil and a second layer sensing coil.

FIG. 12 is a view showing that a controller is provided with an output of an oscillator connected to a sensing coil.

FIG. 13 is a view showing that a container is placed in the correction position on a sensing coil.

FIG. 14 is a view showing electrical properties of resonance current flowing in each pair of sensing coils when a container is placed in the correction position.

FIG. 15 is a view showing that a container is eccentric on a sensing coil.

FIG. 16 is a view showing that amplitude of resonance current flowing in any one pair of sensing coils decreases when a container is eccentric.

FIG. 17 is a view showing that a frequency of resonance current flowing in any one pair of sensing coils decreases when a container is eccentric.

DETAILED DESCRIPTION OF EXEMPLARY EMBODIMENTS

The above-described aspects, features and advantages are specifically described hereunder with reference to the accompanying drawings so that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague.

The terms "first", "second" and the like are used herein only to distinguish one component from another component. Thus, the components should not be limited by the terms. When any one component is described as being "connected" or "coupled" to another component, any one component can be directly connected or coupled to another component, but an additional component can be "interposed" between the two components or the two components can be "connected" or "coupled" by an additional component. In the disclosure, the singular forms "a", "an" and "the" are intended to include the plural forms as well, unless explicitly indicated otherwise. It is to be understood that the term "comprise" or "include," when used in this disclosure, is not interpreted as necessarily including stated components or steps.

Hereafter, an induction heating device of one embodiment, and a method of operating the same are specifically described with reference to FIGS. 3 to 17.

FIG. 3 is a view showing an induction heating device of one embodiment, and a container placed on the induction heating device. Additionally, FIG. 4 is a view showing that a heating coil separates from a sensing part including first and second layer sensing coils, in one embodiment.

FIGS. 5 to 7 are views showing disposition of sensing coils in each embodiment.

FIG. 8 is view showing that a first layer sensing coil and a second layer sensing coil are misaligned, and FIG. 9 is a view showing that a first layer sensing coil and a second layer sensing coil, wound in opposite directions, connect to each other.

FIG. 10 is a view showing that any one first layer sensing coil is disposed to overlap two adjacent second layer sensing coils.

FIG. 11 is a view showing that a controller allows resonance current to flow in a pair of a first layer sensing coil and a second layer sensing coil, and FIG. 12 is a view showing that a controller is provided with an output of an oscillator connected to a sensing coil.

FIG. 13 is a view showing that a container is placed in the correction position on a sensing coil, and FIG. 14 is a view showing electrical properties of resonance current flowing in each pair of sensing coils when a container is placed in the correction position.

FIG. 15 is a view showing that a container is eccentric on a sensing coil. FIG. 16 is a view showing that amplitude of resonance current flowing in any one pair of sensing coils decreases when a container is eccentric, and FIG. 17 is a view showing that a frequency of resonance current flowing in any one pair of sensing coils decreases when a container is eccentric.

Referring to FIG. 3, the induction heating device 1 of one embodiment may include an upper plate 10 on which a container 2 is placed, and a control plate 30 on which user manipulation is performed.

A display 31 displaying operation information, state information and the like of the induction heating device 1, a plurality of buttons 32 for inputting user manipulation, and a knob switch 33 may be disposed on the control plate 30.

The knob switch 33 may generate a signal based on a degree to which the knob switch 33 rotates, and a heating coil 110 described hereafter may output power based on the signal generated by the knob switch 33. In other words, the output of the heating coil 110 may be controlled based on the degree of the knob switch 33's rotation.

Additionally, the heating coil 110 and a sensing part 120 may be disposed inside the upper plate 10, and a guide line 20 for guiding the container 2 to the upper portion of the heating coil 110 may be formed on the upper plate 10.

Current may flow in the heating coil 110 under the control of a controller 130 described below. Accordingly, a magnetic field may be generated in the heating coil 110. The magnetic field generated in the heating coil 110 may induce eddy current to the container 2 placed on the heating coil 110 of the upper plate 10, and the container 2 may be heated by Joule's heat produced by the induced current.

For induced current to be generated, the container 2 may be made of any ingredient having a magnetic property. For example, the container 2 may be made of cast iron including iron (Fe), or a clad where iron (Fe) and stainless steel and the like are joined.

That is, the induction heating device 1 according to the present disclosure heats the container 2 using the magnetic field produced in the heating coil 110. In the electromagnetic induction-based heating described above, the heating coil 110 and the container 2 need to be aligned perpendicularly, to maximize heating efficiency and evenly heat the container 2.

However, ordinary users often place the container 2 approximately on the induction heating device 1 because the user does not understand why the container 2 is aligned with the heating coil 110 on the induction heating device 1 technically. Thus, sometimes, the container 2 may be away from the center of the heating coil 110 of the induction heating device 1.

Due to eccentricity, a food item to be cooked in the container 2 is undercooked or overheated depending on a position of the food item. Thus, cooking quality may deteriorate. To prevent this from happening, the induction heating device 1 itself needs to detect eccentricity of the container 2, so that a user can recognize eccentricity of the container 2.

To this end, the induction heating device 1 according to the present disclosure may include a sensing part 120 comprised of a plurality of first layer sensing coils 121 and a plurality of second layer sensing coils 122. Hereafter, structural features of the sensing part 120 are specifically described with reference to FIGS. 4 to 10.

Referring to FIG. 4, the sensing part 120 may include the plurality of first layer sensing coils 121 and the plurality of second layer sensing coils 122 that are spaced from a central perpendicular line CL of the heating coil 110 at regular intervals and arranged side by side along a circumferential direction.

The plurality of first layer sensing coils 121 and the plurality of second layer sensing coils 122 may be disposed to contact each other perpendicularly, or spaced from each other perpendicularly. However, to offset electromotive force induced by the magnetic field generated in the heating coil 110 as described below, the plurality of first layer sensing coils 121 and the plurality of second layer sensing coils 122 are close to each other perpendicularly, for example.

Further, it is to be understood that the 'first layer sensing coil' described hereafter refers to at least one of the plurality of first layer sensing coils 121 and that the 'second layer sensing coil' described hereafter refers to at least one of the plurality of second layer sensing coils 122. For convenience of description, the plurality of first layer sensing coils 121 and the plurality of second layer sensing coils 122 are collectively referred to as sensing coils, and when necessary, the plurality of first layer sensing coils 121 is distinguished from the plurality of second layer sensing coils 122.

The container 2's eccentricity occurs when the bottom surface of the container 2 is away from the center of the heating coil 110. To sense the eccentricity, the sensing part 120 may be formed around the central perpendicular line CL of the heating coil 110. Additionally, the surface area of the sensing part 120 may be the same as or greater than the surface area of the heating coil 110. For example, when the heating coil 110 and the sensing part 120 have a circular shape, as illustrated in FIG. 4, the center of the sensing part 120 and the center of the heating coil 110 are placed on the same perpendicular line, and the diameter of the sensing part 120 may be the same as or greater than the diameter of the heating coil 110.

The plurality of first layer sensing coils 121 may be disposed on the same horizontal surface, and the plurality of second layer sensing coils 122 may also be disposed on the same horizontal surface. The plurality of first and second layer sensing coils 121, 122 may have the same shape.

In this case, among the plurality of first and second layer sensing coils 121, 122, any two horizontally adjacent sensing coils may be spaced from each other at a regular interval. In other words, the plurality of first layer sensing coils 121 may be spaced from each other at regular intervals, and the plurality of second layer sensing coils 122 may be spaced from each other at regular intervals.

Since the plurality of first and second layer sensing coils 121, 122 have the same shape as described above, the shape and structure of the first layer sensing coil 121 are only described with reference to FIGS. 5 to 7.

Referring to FIG. 5, each of the plurality of first layer sensing coils 121 may have a circular planar coil shape. In this case, the first layer sensing coils 121 may be respectively spaced from the central perpendicular line CL of the heating coil 110 at a regular interval, and spaced from each other at regular intervals.

The plurality of first layer sensing coils 121, as illustrated in FIG. 5, may include circular 1-1 to 1-4 sensing coils 121*a*, 121*b*, 121*c*, 121*d*. When the centers of the 1-1 to 1-4 sensing coils 121*a*, 121*b*, 121*c*, 121*d* are respectively defined as 1 to 4 center points cp1, cp2, cp3, cp4, a distance between the first center point cp1 and the central perpendicular line CL may be the same as a distance between the second center point cp2 and the central perpendicular line CL, a distance between the third center point cp3 and the central perpendicular line CL, and a distance between the fourth center point cp4 and the central perpendicular line CL.

Additionally, a distance between the first center point cp1 and the second center point cp2 may be the same as a distance between the second center point cp2 and the third center point cp3, a distance between the third center point cp3 and the fourth center point cp4, and a distance between the fourth center point cp4 and the first center point cp1.

Further, the plurality of first and second layer sensing coils 121, 122 may be respectively disposed to contact each other. In other words, adjacent first layer sensing coils 121 may be disposed to contact each other on the same horizontal surface, and adjacent second layer sensing coils 122 may also be disposed to contact each other on the same horizontal surface.

Referring to FIG. 6, each of the plurality of first layer sensing coils 121 may include square 1-1 to 1-4 sensing coils 121*a*, 121*b*, 121*c*, 121*d*. In this case, the 1-1 sensing coil 121*a* may be disposed to contact the adjacent 1-2 and 1-4 sensing coils 121*b*, 121*d* respectively, and the 1-3 sensing coil 121*c* may be disposed to contact the adjacent 1-2 and 1-4 sensing coils 121*b*, 121*d* respectively.

In this case, the first layer sensing coils 121 may be respectively spaced from the central perpendicular line CL of the heating coil 110 at a regular interval, and spaced from each other at regular intervals.

When the centers of the 1-1 to 1-4 sensing coils 121*a*, 121*b*, 121*c*, 121*d* are respectively defined as 1 to 4 center points cp1, cp2, cp3, cp4, as illustrated in FIG. 6, a distance between the first center point cp1 and the central perpendicular line CL may be the same as a distance between the second center point cp2 and the central perpendicular line CL, a distance between the third center point cp3 and the central perpendicular line CL, and a distance between the fourth center point cp4 and the central perpendicular line CL.

Additionally, a distance between the first center point cp1 and the second center point cp2 may be the same as a distance between the second center point cp2 and the third center point cp3, a distance between the third center point cp3 and the fourth center point cp4, and a distance between the fourth center point cp4 and the first center point cp1.

Furthermore, the plurality of first and second layer sensing coils 121, 122 may have a sector shape and be formed around the central perpendicular line CL.

Referring to FIG. 7, each of the plurality of first layer sensing coils 121 may include sector-shaped 1-1 to 1-4 sensing coils 121*a*, 121*b*, 121*c*, 121*d*. Each first layer sensing coil 121 may have a sector shape in which one side and the other side are surrounded by an arc, and have a central angle θ and a radius r.

In this case, each of the 1-1 to 1-4 sensing coils 121*a*, 121*b*, 121*c*, 121*d* may be disposed in a way that the outer edges (the two sides) of each of the 1-1 to 1-4 sensing coils 121*a*, 121*b*, 121*c*, 121*d* contact adjacent sensing coils. In other words, the two sides of any one sensing coil, among the 1-1 to 1-4 sensing coils 121*a*, 121*b*, 121*c*, 121*d*, may respectively contact any one side of another sensing coil.

To this end, a total of the central angle of each first layer sensing coil 121 may be 360 degrees. As illustrated in FIG. 7, the central angle of each of the 1-1 to 1-4 sensing coils 121*a*, 121*b*, 121*c*, 121*d* may be 90 degrees, and the entire shape of the 1-1 to 1-4 sensing coils 121*a*, 121*b*, 121*c*, 121*d* may be a circle, for example.

In the case of a first layer sensing coil 121 including six sensing coils, the central angle of each sensing coil may be 60 degrees, and the entire shape of the plurality of sensing coils may be a circle.

The example shapes of the first layer sensing coil 121 are described with reference to FIGS. 5 to 7. However, the shapes of the sensing coils are not limited to the above example shapes. Additionally, the first layer sensing coil 121 including four coils is provided as an example and described with reference to FIGS. 5 to 7, for convenience of description. However, the first layer sensing coil 121 may include more than four coils, to improve accuracy of detection of a direction of eccentricity described below.

Further, the example shapes and disposition of the first layer sensing coil 121 are descried with reference to FIGS. 5 to 7. However, the second layer sensing coil 122 may have the same shape and disposition as the first layer sensing coil 121. Hereafter, the first and second layer sensing coils 121, 122 having the shape illustrated in FIG. 7 are described for convenience of description.

Each of the plurality of first layer sensing coils 121 may electrically connect to each of the plurality of second layer sensing coils 122, and be misaligned with each of the plurality of second layer sensing coils 122 perpendicularly.

Referring to FIG. 8, a plurality of first layer sensing coils 121 may include 1-1 to 1-4 sensing coils 121*a*, 121*b*, 121*c*, 121*d*, and a plurality of second layer sensing coils 122 may include 2-1 to 2-4 sensing coils 122*a*, 122*b*, 122*c*, 122*d*. In this case, the 1-1 sensing coil 121*a*, the 1-2 sensing coil 121*b*, the 1-3 sensing coil 121*c*, and the 1-4 sensing coil 121*d* may respectively connect to the 2-1 sensing coil 122*a*, the 2-2 sensing coil 122*b*, the 2-3 sensing coil 122*c*, and the 2-4 sensing coil 122*d*.

In other words, the 1-1 sensing coil 121*a* and the 2-1 sensing coil 122*a*, the 1-2 sensing coil 121*b* and the 2-2 sensing coil 122*b*, the 1-3 sensing coil 121*c* and the 2-3 sensing coil 122*c*, and the 1-4 sensing coil 121*d* and 2-4 sensing coil 122*d* may be comprised of a single conducting wire respectively, and form a pair.

Hereafter, the 1-1 sensing coil 121*a* and the 2-1 sensing coil 122*a* is referred to as a first pair of sensing coils L1, the 1-2 sensing coil 121*b* and the 2-2 sensing coil 122*b* as a second pair of sensing coils L2, the 1-3 sensing coil 121*c* and the 2-3 sensing coil 122*c* as a third pair of sensing coils L3, and the 1-4 sensing coil 121*d* and 2-4 sensing coil 122*d* as a fourth pair of sensing coils L4.

Referring back to FIG. 8, the second layer sensing coil 122 may be disposed on the first layer sensing coil 121. In this case, the second layer sensing coil 122 may be misaligned with the first layer sensing coil 121 circumferentially. Specifically, when the first layer sensing coil 121 and the second layer sensing coil 122 include a plurality of sensing coils that has a sector shape and is disposed around the central perpendicular line CL of the heating coil 110, the second layer sensing coil 122 may be misaligned with the first layer sensing coil 121 by a reference angle θr counterclockwise.

FIG. 9 is a view only showing the first pair of sensing coils L1 separate from the first layer sensing coil 121 and the second layer sensing coil 122 illustrated in FIG. 8.

Referring to FIG. 9, based on the above-described disposition and connection relationship, the 1-1 layer sensing coil 121*a* and the 2-1 layer sensing coil 122*a* included in the first pair of sensing coils L1 may be disposed vertically and comprised of a single conducting wire. In this case, the 1-1 layer sensing coil 121*a* may be misaligned with the 2-1 layer sensing coil 122*a* perpendicularly. That is, any one of the 1-1 sensing coil 121*a* and the 2-1 sensing coil 122*a* may be misaligned circumferentially with the other such that the 1-1 sensing coil 121*a* does not completely overlap the 2-1 sensing coil 122*a* perpendicularly.

The first and second layer sensing coils 121, 122 may be stacked on a single printed circuit board (PCB) substrate such that the first and second layer sensing coils 121, 122 connect to each other and are fixedly misaligned perpendicularly. For example, the first layer sensing coil 121 may be fixedly disposed in the PCB substrate, and the second layer sensing coil 122 may be stacked on the first layer sensing coil 121 and fixedly disposed on the PCB substrate.

Additionally, winding directions of the first layer sensing coil 121 and the second layer sensing coil 122 may be opposite to each other. When the first and second layer sensing coils 121, 122 are planar coils as described above, any one of the first and second layer sensing coils 121, 122 may be wound clockwise, and the other may be wound counterclockwise.

Referring back to FIG. 9, the 2-1 sensing coil 122*a* of the first pair of sensing coils L1 may be wound clockwise, and the 1-1 sensing coil 121*a* of the first pair of sensing coils L1 may be wound counterclockwise.

Accordingly, induced electromotive force generated in a pair of sensing coils may be offset. Specifically, as illustrated in FIG. 9. The first pair of sensing coils L1 may be disposed on the heating coil 110, and disposed in the area of the magnetic field E generated upward in the heating coil 110.

Induced electromotive force may be generated respectively in the 1-1 sensing coil 121*a* and the 2-1 sensing coil 122*a* constituting the first pair of sensing coils L1. In this case, since the 1-1 sensing coil 121*a* and the 2-1 sensing coil 122*a* are wound in opposite directions, induced electromotive force caused by a magnetic field E supplied in one direction is generated in each of the sensing coils 121*a*, 122*a* in opposite directions. Accordingly, the induced electromotive force generated in the 1-1 sensing coil 121*a* and the induced electromotive force generated in the 2-1 sensing coil 122*a* may be mutually offset.

Thus, the magnetic field E generated in the heating coil 110 cannot generate induced electromotive force in the first and second layer sensing coils 121, 122. As a result, the magnetic field E generated in the heating coil 110 may all be used to heat the container 2 placed on the heating coil 110.

According to the present disclosure, since the magnetic field E output from the heating coil 110 is structurally prevented from being offset by the sensing coils placed on the heating coil 110, thereby fundamentally preventing a decrease in heating efficiency, caused by the operation of sensing eccentricity.

Further, since the first layer sensing coil 121 and the second layer sensing coil 122 are misaligned perpendicularly, as described above, the second layer sensing coil 122 may partially overlap the first layer sensing coil 121, connected to the second layer sensing coil 122, perpendicularly.

FIG. 10 is a top view schematically showing a 1-1 sensing coil 121*a*, a 1-4 sensing coil 121*d* adjacent to the 1-1 sensing coil 121*a*, and a 2-1 sensing coil 122*a* connected to the 1-1 sensing coil 121*a*.

Referring to FIG. 10, the 2-1 sensing coil 122*a* may be disposed to partially overlap the 1-1 sensing coil 121*a*, connected to the 2-1 sensing coil 122*a*, perpendicularly. Additionally, since the 1-1 sensing coil 121*a* contacts the 1-4 sensing coil 121*d*, the 2-1 sensing coil 122*a* may also be disposed to partially overlap the 1-4 sensing coil 121*d* perpendicularly, In other words, the second layer sensing coil 122 may partially overlap each of the two adjacent first layer sensing coils 121*a*, 121*d* perpendicularly.

In this case, the first and second layer sensing coils 121, 122 may be disposed so that a coupling coefficient k between any one pair of sensing coils and each pair of sensing coils adjacent to the any one pair of sensing coils can be the same. That is, the coupling coefficient relates to the positions of the sensing coils.

Referring back to FIG. 8, the first pair of sensing coils L1 may be adjacent to the second pair of sensing coils L2 and the fourth pair of sensing coils L4. In this case, the first, second and fourth pairs of sensing coils L1, L2, L4 may be disposed so that a coupling coefficient between the first pair of sensing coils L1 and the second pair of sensing coils L2, and a coupling coefficient between the first pair of sensing coils L1 and the fourth pair of sensing coils L4 can be the same.

Likewise, the second pair of sensing coils L2 may be adjacent to the first pair of sensing coils L1 and the third pair of sensing coils L3. In this case, the first, second and third pairs of sensing coils L1, L2, L3 may be disposed so that a coupling coefficient between the first pair of sensing coils L1 and the second pair of sensing coils L2, and a coupling coefficient between the second pair of sensing coils L2 and the third pair of sensing coils L3 can be the same.

Inductance of each pair of sensing coils L1, L2, L3, L4 may be properly adjusted so that a coupling coefficient among adjacent pairs of sensing coils L1, L2, L3, L4 can be the same.

However, when each of the sensing coils included in the sensing part 120 has the same shape and the same inductance, the second layer sensing coil 122 may be disposed in a way that the second layer sensing coil 122 and each of the two adjacent first layer sensing coils 121 form an overlapping area of the same size.

Referring back to FIG. 10, the 2-1 sensing coil 122*a* may be disposed to overlap each of the 1-1 sensing coil 121*a* and the 1-4 sensing coil 121*d* perpendicularly. In this case, the surface of the area where the 2-1 sensing coil 122*a* overlaps the 1-1 sensing coil 121*a*, and the surface of the area where the 2-1 sensing coil 122*a* overlaps the 1-4 sensing coil 121*d* may have the same size.

When the first and second layer sensing coils 121, 122 are formed into a sector having a central angle of 90 degrees, as illustrated in FIG. 10, the second layer sensing coil 122 may be misaligned circumferentially by 45 degrees with respect to the first layer sensing coil 121. Thus, the second layer sensing coil 122 and each of the two adjacent first layer sensing coils 121 form an overlapping area of the same size.

The above-described disposition can result in the same coupling coefficient between the first pair of sensing coils L1 and the second pair of sensing coils L2, between the second pair of sensing coils L2 and the third pair of sensing coils L3, between the third pair of sensing coils L3 and the fourth pair of sensing coils L4, and between the fourth pair of sensing coils L4 and the first pair of sensing coils L1.

Accordingly, when the container 2 is not placed on the heating coil 110 or is placed in the correct position on the heating coil 110, each pair of sensing coils L1, L2, L3, L4 may have the same resonance point. Description in relation to this is provided below.

Hereafter, a method of detecting eccentricity of the container 2 based on a change in electrical properties of the above sensing part 120 is specifically described with reference to FIGS. 11 to 17.

Referring to FIG. 11, each pair of sensing coils L1, L2, L3, L4 constituting the sensing part 120 may connect to the controller 130. Specifically, one end of each first layer sensing coil 121 and one end of each second layer sensing coil 122 may connect to each other, and the other end of each first layer sensing coil 121 and the other end of each second layer sensing coil 122 may connect to the controller 130.

The controller 130 may detect eccentricity of the container 2 placed on the heating coil 110, based on a change in resonance current generated in the sensing part 120. In other words, the controller 130 may detect resonance current flowing in both ends of each pair of sensing coils L1, L2, L3, L4, and based on a change in electrical properties of the detected resonance current, detect eccentricity of the container 2.

The controller 130 may include at least one physical component among application specific integrated circ (ASICs), digital signal processors (DSPs), digital signal processing devices (DSPs), programmable logic devices (PLDs), field programmable gate arrays (FPGAs), processors, controllers, micro-controllers, and microprocessors.

When the container 2 is not placed on the heating coil 110, or is placed in the correct position on the heating coil 110, each pair of sensing coils L1, L2, L3, L4 may have the same resonance point. Specifically, when the shapes and dispositions of the sensing coils are all the same and coupling coefficients among adjacent sensing coils are all the same, as described above, other adjacent sensing coils (???) may have the same electromagnetic effect on all the sensing coils.

Accordingly, each sensing coil may have the same resonance point, and resonance current having predetermined magnitude and resonance frequencies may flow in each sensing coil.

When the container 2 is eccentric on the heating coil 110, the container 2 placed on the heating coil 110 may have a different electromagnetic effect on each sensing coil. Accordingly, each sensing coil may have a different resonance point, and resonance current having different magnitude and different frequencies may flow in each sensing coil.

The controller 130 may sense eccentricity of the container 2 by sensing the above-described electric change. Specifically, the controller 130 may sense eccentricity of the container 2, based on at least one of changes in the amplitude and frequency of resonance current flowing in the sensing coil.

When the container 2 is placed in the correct position, all the plurality of sensing coils may completely overlap the container 2 perpendicularly. In other words, the bottom surface of the container 2 may be disposed to cover the upper portions of all the sensing coils.

When the container 2 is eccentric, at least one of the plurality of sensing coils may not completely overlap the container 2 perpendicularly. In other words, the bottom surface of the container 2 may be disposed to cover the upper portions of some of the sensing coils only.

In this case, amplitude of resonance current flowing in the sensing coils that do not completely overlap the container 2 perpendicularly may be lower than that of resonance current flowing in the sensing coils that completely overlap the container 2 perpendicularly. Additionally, a frequency of resonance current flowing in the sensing coils that do not completely overlap the container 2 perpendicularly may be lower than that of resonance current flowing in the sensing coils that completely overlap the container 2 perpendicularly.

The controller 130 may compare the amplitude of the resonance current with reference magnitude to determine whether the container 2 is eccentric. That is, when the amplitude of the resonance current is less than the reference magnitude, the controller may determine that the container 2 is eccentric.

Additionally, the controller 130 may compare the frequency of the resonance current with a reference frequency to determine whether the container 2 is eccentric. That is, when the frequency of the resonance current is less than the reference frequency, the controller may determine that the container 2 is eccentric.

To generate resonance current in each sensing coil, each pair of sensing coils L1, L2, L3, L4 may connect to the oscillator 140, and the controller 130 may identify a change in the resonance current, based on an output of the oscillator 140.

Referring to FIG. 12, each pair of sensing coils L1, L2, L3, L4 constituting the sensing part 120 may be equalized by the inductor L having inductance of predetermined magnitude, and parasitic resistance ESR. In this case, each pair of sensing coils L1, L2, L3, L4 may connect to the oscillator 140.

The oscillator 140 may connect in parallel with each pair of sensing coils L1, L2, L3, L4, and include an amplifier including a capacitor C that determines a resonance frequency, and a plurality of resistances Ra, Rb, Rc. As power is supplied to the oscillator 140 by the controller 130, predetermined magnitude of current having a resonance frequency may flow in each pair of sensing coils L1, L2, L3, L4.

The oscillator 140 may convert current flowing in the sensing coil into amplified voltage and output the amplified voltage, and the controller 130 may detect eccentricity of the container 2, based on the output Vout of the oscillator 140.

The controller 130 may detect a direction of the container 2's eccentricity, based on the position of the sensing coil where resonance current changes. Hereafter, suppose that the oscillator 140 illustrated in FIG. 12 is used to detect a direction of eccentricity.

FIG. 13 is a top view showing that a container 2 is placed in the correct position, i.e., all the plurality of sensing coils completely overlaps the container 2 perpendicularly. FIG. 14 is a view showing electrical properties of resonance current flowing in each pair of sensing coils L1, L2, L3, L4 when a container 2 is placed in the correct position.

Referring to FIGS. 13 and 14, when the container 2 is placed in the correct position, the resonance point of each sensing coil may be the same, as described above. Accordingly, resonance current having the same magnitude and the same resonance frequency may flow in each sensing coil.

Since the magnitude and frequency of current flowing in each pair of sensing coils L1, L2, L3, L4 are the same, magnitude and frequency of voltage at which the current is scaled may be the same. Specifically, as illustrated in FIG. 14, the amplitude and frequency of each of the output Vout_L1 of the oscillator 140 connected to the first pair of sensing coils L1, the output Vout_L2 of the oscillator 140 connected to the second pair of sensing coils L2, the output Vout_L2 of the oscillator 140 connected to the third pair of sensing coils L3, and the output Vout_L4 of the oscillator 140 connected to the fourth pair of sensing coils L4 may be the same.

FIG. 15 is a top view showing that a container 2 is eccentric, i.e., at least one of the plurality of sensing coils does not completely overlap the container 2 perpendicularly. FIG. 16 is a view showing that amplitude of resonance current flowing in any one pair of sensing coils decreases when a container 2 is eccentric. Referring to FIGS. 15 and 16, the resonance point of at least one sensing coil when the container 2 is eccentric may differ from the resonance point of at least one sensing coil when the container 2 is placed in the correct position, as described above.

For example, as illustrated in FIG. 15, the fourth pair of sensing coils L4 may not completely overlap the container 2 perpendicularly. Accordingly, the resonance point of the fourth pair of sensing coils L4 may differ from the resonance points of the first to third pairs of sensing coils L1, L2, L3. In other words, the magnitude and frequency of current flowing in the fourth pair of sensing coils L4 may differ from the magnitude and frequency of current flowing in the first to third pairs of sensing coils L1, L2, L3.

Because of the above-described difference in the resonance points, the output Vout_L4 of the oscillator 140 connected to the fourth pair of sensing coils L4 may also differ from each of the outputs Vout_L1, Vout_L2, Vout_L3 of the oscillator 140 connected to the first to third pairs of sensing coils L1, L2, L3.

In an example, referring to FIG. 16, the amplitude M2 of the output Vout_L4 of the oscillator 140 connected to the fourth pair of sensing coils L4 may be less than the amplitude M1 of the outputs Vout_L1, Vout_L2, Vout_L3 of the oscillator 140 connected to the first to third pairs of sensing coils L1, L2, L3.

The controller 130 may compare the amplitude M2 of the output Vout_L4 of the oscillator 140 connected to the fourth pair of sensing coils L4 with reference magnitude or with the amplitude M1 of the outputs Vout_L1, Vout_L2, Vout_L3 of the oscillator 140 connected to the first to third pairs of sensing coils L1, L2, L3, to determine that the container 2 is eccentric.

In another example, referring to FIG. 17, the frequency 1/T2 of the output Vout_L4 of the oscillator 140 connected to the fourth pair of sensing coils L4 may be less than the frequency 1/T1 of the outputs Vout_L1, Vout_L2, Vout_L3 of the oscillator 140 connected to the first to third pairs of sensing coils L1, L2, L3.

The controller 130 may compare the frequency 1/T2 of the output Vout_L4 of the oscillator 140 connected to the fourth pair of sensing coils L4 with a reference frequency, or with the frequency 1/T1 of the outputs Vout_L1, Vout_L2, Vout_L3 of the oscillator 140 connected to the first to third pair of sensing coils L1, L2, L3, to determine that the container 2 is eccentric.

According to the present disclosure, since the sensing coils disposed on the heating coil 110 sense that the container 2 is eccentric, as described above, a space in the induction heating device 1 may be efficiently used.

In addition to sensing eccentricity, the controller 130 may identify a sensing coil where resonance current changes. Additionally, the controller 130 may determine that the container 2 is eccentric in direction symmetrical to the direction of the sensing coil identified with respect to the central perpendicular line CL.

When the container 2 is eccentric in the right-downward direction, as illustrated in FIG. 15, the controller 130 may identify the fourth pair of sensing coils (L4) as the sensing coil where resonance current changes, using the method described with reference to FIGS. 16 and 17.

In this case, the controller 130 may identify the left-upward direction as the direction of the disposition of the fourth pair of sensing coils L4 based on identification information of the fourth pair of sensing coils L4, with respect to the central perpendicular line CL. Then the controller 130 may determine the right-downward direction symmetrical to the direction of the disposition of the fourth sensing coil as the direction De of the eccentricity of the container 2, with respect to the central perpendicular line CL.

According to the present disclosure, since the sensing coils arranged side by side circumferentially sense the direction of the eccentricity of the container 2, as described above, the user may be informed of a direction of movement of the container 2 so that the container 2 can be placed in the correct position, thereby effectively guiding the container 2 to the correction position.

The embodiments are described above with reference to a number of illustrative embodiments thereof. However, embodiments are not limited to the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. An induction heating device, comprising:

a heating coil;

a sensing part comprising a plurality of first layer sensing coils and a plurality of second layer sensing coils that are spaced from the heating coil perpendicularly; and a controller configured to detect an eccentric placement of a container on the heating coil, based on a change in resonance current flowing in a pair of the first layer sensing coil and the second layer sensing coil in the sensing part, wherein each of the plurality of first layer sensing coils electrically connects to a corresponding second layer sensing coil among the plurality of second layer sensing coils, and the first layer sensing coil and the second layer sensing coil that connect to each other are misaligned perpendicularly with respect to each other, and are wound in opposite directions with respect to each other.

2. The induction heating device of claim 1, wherein any two horizontally adjacent sensing coils, among the plurality of first layer sensing coils and the plurality of second layer sensing coils, are spaced from each other at a regular interval.

3. The induction heating device of claim 1, wherein each of the plurality of first layer sensing coils are arranged adjacent to each other and each of the plurality of second layer sensing coils are arranged adjacent to each other.

4. The induction heating device of claim 1, wherein the plurality of first layer sensing coils are spaced from a central perpendicular line passing through a center of the heating coil and are arranged side by side circumferentially around the central perpendicular line, the plurality of second layer sensing coils are spaced from the central perpendicular line and are arranged side by side circumferentially around the central perpendicular line, and each of the plurality of first layer sensing coils and the plurality of second layer sensing coils has a sector shape.

5. The induction heating device of claim 1, wherein the plurality of first layer sensing coils and the plurality of second layer sensing coils have the same shape.

6. The induction heating device of claim 1, wherein the first layer sensing coil and the second layer sensing coil that connect to each other are disposed to partially overlap with each other perpendicularly.

7. The induction heating device of claim 1, wherein the second layer sensing coil partially overlaps with each of two adjacent first layer sensing coils perpendicularly.

8. The induction heating device of claim 1, wherein a coupling coefficient of one pair of the first layer sensing coil and the second layer sensing coil that are connected to each other is the same as a coupling coefficient of an adjacent pair of the first layer sensing coil and the second layer sensing coil that are connected to each other.

9. The induction heating device of claim 1, wherein the second layer sensing coil is disposed on two adjacent first layer sensing coils in a way that the second layer sensing coil overlaps an area of a same size in each of the two adjacent first layer sensing coils.

10. The induction heating device of claim 1, wherein the controller is configured to detect the eccentricity placement of the container on the heating coil, based on at least one of changes in amplitude and a frequency of the resonance current flowing in the pair of the first layer sensing coil and the second layer sensing coil in the sensing part.

11. The induction heating device of claim 1, comprising an oscillator that connects to the pair of the first layer sensing coil and the second layer sensing coil that are connected to each other, wherein the controller is configured to detect the change in the resonance current flowing in the pair of the first layer sensing coil and the second layer sensing coil, based on an output of the oscillator.

12. The induction heating device of claim 1, wherein the controller is configured to detect a direction of the eccentric placement of the container on the heating coil, based on a position of the pair of the first layer sensing coil and the second layer sensing coil in the sensing part in which the resonance current changes.

13. The induction heating device of claim 1, wherein the controller is configured to determine that the container is placed eccentrically on the heating coil when an amplitude of the resonance current flowing in the pair of the first layer sensing coil and the second layer sensing coil is less than a reference magnitude.

14. The induction heating device of claim 1, wherein the controller is configured to determine that the container is placed eccentrically on the heating coil when a frequency of the resonance current flowing in the pair of the first layer sensing coil and the second layer sensing coil is less than a reference frequency.

15. The induction heating device of claim 1, wherein the controller configured to identify the pair of the first layer sensing coil and the second layer sensing coil in which the resonance current changes, and determine that the container is placed eccentrically on the heating coil in a direction symmetrical to a direction of the identified pair of the first layer sensing coil and the second layer sensing coil with respect to a central perpendicular line passing through a center of the heating coil.

* * * * *